United States Patent [19]
Uematsu et al.

[11] Patent Number: 5,988,890
[45] Date of Patent: Nov. 23, 1999

[54] ROTOR SHAFT

[75] Inventors: Kazuo Uematsu; Tadao Yashiki; Kouichi Akagi, all of Takasago, Japan

[73] Assignee: Mitsubishi Heavy Industries Co., Ltd., Tokyo, Japan

[21] Appl. No.: 09/018,731

[22] Filed: Feb. 4, 1998

[51] Int. Cl.[6] .................................................. F16C 19/49

[52] U.S. Cl. ........................................... 384/454; 384/517

[58] Field of Search ................................... 384/517, 518, 384/563, 454, 516

[56] References Cited

U.S. PATENT DOCUMENTS 4,226,485   10/1980   Pruvot .................................... 384/563
4,573,809   3/1986    Jacob ..................................... 384/517

Primary Examiner—Lenard A. Footland
Attorney, Agent, or Firm—Wenderoth, Lind & Ponack, L.L.P.

[57] ABSTRACT

A rotor shaft that is supported by a deep groove ball bearing a radial load and a unidirectional thrust load, and by a cylindrical roller bearing for bearing a radial load. Also, a pretension applying means is provided for applying a pretension to the rotor shaft in the same direction as the thrust load which is borne by the deep groove ball bearing.

3 Claims, 2 Drawing Sheets

ROTOR SHAFT

BACKGROUND OF THE INVENTION

1. Field of the Invention

The present invention relates to a rotor shaft which is supported by a deep groove ball bearing and a cylindrical roller bearing and which is used for an aircraft gas turbine and the like.

2. Description of the Related Art

FIG. 2 is an illustrative view of a conventional rotor shaft for use with an aircraft gas turbine and the like. The shaft is supported by a deep groove ball bearing and a cylindrical roller bearing. In FIG. 2, the rotor shaft is supported by three heavy load and high-speed rotation roller bearings. That is, at predetermined portions on the side of a joint of the rotor shaft 1 and on the side opposite thereto, there are respectively arranged cylindrical roller bearings 3 each of which has a large load bearing capacity with respect to a radial load and a coefficient of friction that is smaller than that of other type roller bearings and which is resistant against an impact load and is suitable for heavy-load and high-speed rotation of the rotor shaft. Also, at a predetermined portion on the side of the joint, there is arranged a single deep groove ball bearing 2 for bearing a thrust load applied on the rotor shaft 1 during its high-speed rotation.

As described above, the conventional rotor shaft 1 of an aircraft gas turbine engine and the like has a disadvantage in that, since the rotor shaft 1 is supported by the three bearings, the torque loss due to the bearings is extremely great and the rotor shaft is forced to become lengthy which results in giving rise to an adverse effect regarding weight reduction and the maintenance of rigidity of the rotor shaft thereby contributing to an increase in the manufacturing costs of the aircraft gas turbine and the like.

SUMMARY OF THE INVENTION

An object of the present invention is to provide a rotor shaft which is capable of solving the above-described problems, which have been experienced with the conventional rotor shafts of aircraft gas turbines and the like. The rotor shaft according to the present invention is provided with a deep groove ball bearing arranged so as to bear a radial load and a unidirectional thrust load, a cylindrical roller bearing arranged so as to bear a radial load, and means for applying a pretension on the rotor shaft in the same direction as the thrust load. The deep groove ball bearing can be subjected to not only a thrust load but also a radial load if it is pressed in the axial direction to regulate the movement of the rotor shaft. Accordingly, by applying an axial pretension on the rotor shaft in advance, the direction of application of the thrust load on the rotor shaft is determined to be unidirectional so as to regulate the direction of displacement of the rotor shaft so that both the radial load and the thrust load can be borne by the deep groove ball bearing. Consequently, it becomes possible to support the rotor shaft by two roller bearings by eliminating one of the conventional cylindrical roller bearings bearing the radial load.

BRIEF DESCRIPTION OF THE DRAWINGS

FIG. 2 is a front view of a conventional rotor shaft for use with an aircraft gas turbine and the like.

DETAILED DESCRIPTION OF THE INVENTION

Figure 1A:
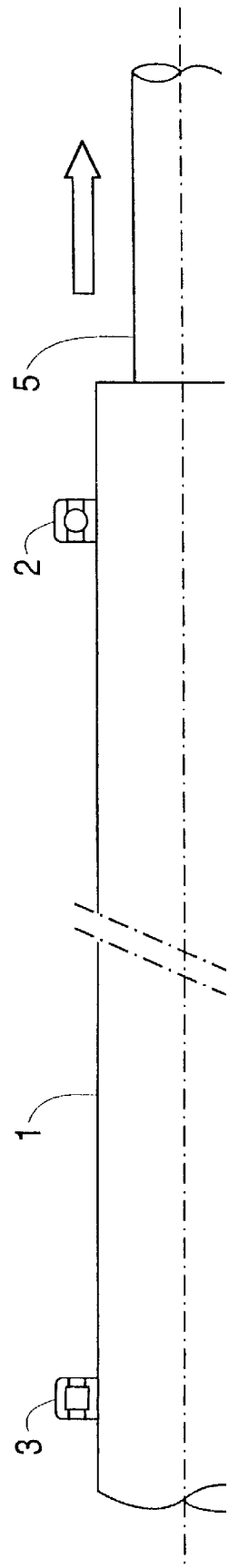
FIG. 1(a) is a front view of a rotor shaft for use with an aircraft gas turbine and the like according to one embodiment of the present invention.
Figure 1B:
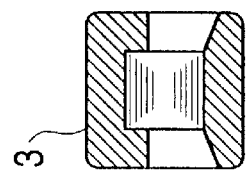
FIG. 1(b) is a sectional view of a cylindrical roller bearing to be used with the rotor shaft shown in FIG. 1(a)
Figure 1C:
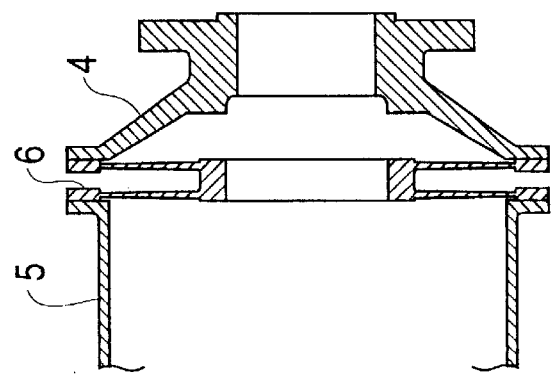
FIG. 1(c) is a sectional view of a diaphragm type coupling for the rotor shaft shown in FIG. 1(a)
Figure 2:
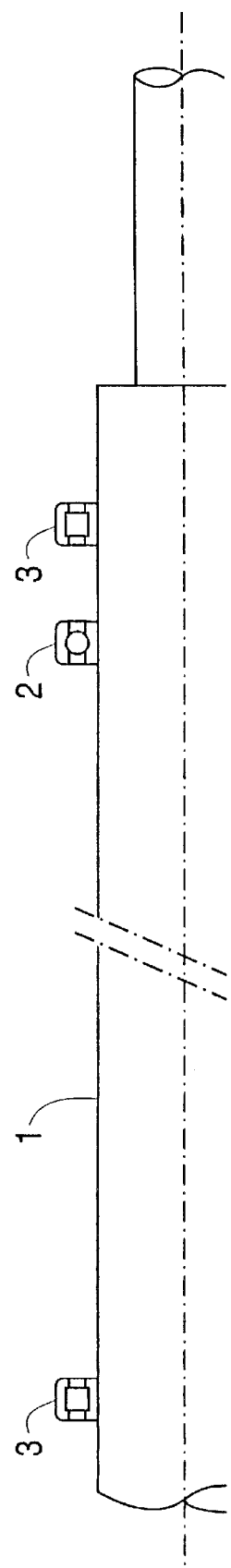

FIG. 1 is an illustrative view of a rotor shaft of an aircraft gas turbine and the like according to one embodiment of the present invention. In FIG. 1(a), the rotor shaft 1 is supported by two heavy-load and high-speed rotation roller bearings. That is, at a predetermined portion of the rotor shaft 1 on the side opposite to a joint, there is arranged a cylindrical roller bearing 3 which has a large radial-load bearing capacity and a coefficient of friction smaller than that of other type roller bearings and which is resistant against an impact load and is suitable for heavy-load and high-speed rotation. Also, on the other side, there is arranged a deep groove ball bearing 2 for bearing a thrust load during the high-speed rotation of the rotor. Further, a pretension for pulling the rotor shaft 1 in the axial direction is applied on the rotor shaft 1 so that a radial load and a unidirectional thrust load are applied to the deep groove ball bearing 2. The rotor shaft 1 is supported by the deep groove ball bearing 2 on the side of the joint and by the cylindrical roller bearing 3 on the side opposite to the joint. That is, at a terminal end of the rotor shaft 1, there is attached a diaphragm type coupling 6 between an intermediate shaft 5 and a flange 4. Accordingly, an axial pretension, shown by the arrow in FIG. 1(a), is applied in advance on the intermediate shaft 5 by means of a spring of the diaphragm type coupling 6 to set the deep groove ball bearing 2, thereby unidirectionally determining the direction of application of the thrust load so as to regulate the axial directional displacement of the rotor shaft 1 so that the deep groove ball bearing 2 bears the radial load and the unidirectional thrust load. Further, by positioning or arranging the cylindrical roller bearing 3 for bearing the radial load on the side opposite the joint, the entire load on the rotor shaft 1 is borne by these two roller bearings.

Generally, if movement of the rotor shaft 1 is regulated by pressing the deep groove ball bearing 2 in the axial direction, the bearing 2 can bear the radial load and can also be used as a thrust bearing with respect to the high-speed rotation of the rotor shaft 1. Accordingly, when the diaphragm type coupling at the end of the rotor shaft 1 is set up, if an axial pretension is applied to the rotor shaft 1 by means of the spring of the coupling 6, the direction of the application of the thrust load on the rotor shaft 1 is determined to become unidirectional so as to regulate the direction of displacement of the rotor shaft 1. Thereby the radial load can also be borne by the deep groove ball bearing 2 with the result that one of the conventional three cylindrical roller bearings 3 can be omitted and the rotor shaft 1 can be supported by the two roller bearings.

The conventional rotor shaft of the aircraft gas turbine and the like has been supported by three roller bearings and therefore, the torque loss caused by these bearings is extremely great. Also, since it is necessary to make the rotor shaft longer, adverse effects arise with respect to weight reduction and the maintenance of rigidity of the rotor shaft thereby contributing to an increase in the manufacturing costs of the aircraft gas turbine and the like. In order to eliminate the above-described drawbacks of the conventional aircraft gas turbine rotor shaft and the like, the rotor shaft of the present invention is characterized in that a pretension is applied to the rotor shaft 1 in the axial direction of the rotor by the spring effect of the diaphragm type coupling 6 which is attached to one end of the rotor shaft when the deep groove ball bearing 2 is set up. Thereby, the direction of application of the thrust load on the rotor shaft 1 is determined to be unidirectional so that axial displacement of the rotor shaft 1 is regulated, and the radial load and the unidirectional thrust load are borne by the deep groove ball bearing 2 on the joint side. Further, by arranging the cylindrical roller bearing 3 on the side of the rotor shaft 1 opposite the joint so as to cause it to bear the radial load, it is possible to cause the entire load on the rotor shaft 1 to be borne only by these two bearings. Thus, the rotor shaft 1 is supported in such a manner that a pretension capable of pulling the rotor shaft 1 in the axial direction is applied on the rotor shaft 1 so that the radial load and the unidirectional thrust load on the rotor shaft 1 are borne by the single deep groove ball bearing 2 and the radial load is also borne by the single cylindrical roller bearing 3. In this manner, by making the best use of the characteristics of the roller bearing and by causing the deep groove ball bearing 2 to bear both the radial and thrust load on the rotor shaft 1, it is possible to omit the use of one cylindrical roller bearing 3. Thus, the torque loss caused by the bearings is reduced and the weight reduction and the maintenance of the rigidity of the rotor shaft 1 can be expected due to shortening of the length of the rotor shaft 1 thereby greatly contributing to reduced manufacturing costs of the aircraft gas turbine and the like.

With the above-described structure, when a pretension is applied to the rotor shaft in the axial direction thereof, the direction of application of the thrust load on the rotor shaft is unidirectionally determined so as to regulate the direction of displacement of the rotor shaft thereby causing the deep groove ball bearing to bear both the radial load and the thrust load. Consequently, it becomes possible to support the rotor shaft by only two of the conventional three roller bearings. The third roller bearing can be omitted so that the torque loss caused by the bearings is reduced, the rotor shaft is shortened which reduces its weight and increases its rigidity thereby contributing to a reduction of the manufacturing costs of the aircraft gas turbine, for example.

What is claimed is:

1. An assembly comprising:

a rotor shaft;

a ball bearing positioned on one side of said rotor shaft for bearing a radial load and a unidirectional thrust load applied to said rotor shaft;

a cylindrical roller bearing positioned on the other side of said rotor shaft for bearing the radial load applied to said rotor shaft; and a pretension applying means for applying a pretension force to said rotor shaft in the same direction as the unidirectional thrust load borne by said ball bearing.

2. The assembly as claimed in claim 1, wherein said pretension applying means comprises a diaphragm type.

3. The assembly as claimed in claim 2, wherein said diaphragm type coupling comprises:

an intermediate shaft connected to said rotor shaft;

a flange portion; and a resilient diaphragm disposed between said intermediate shaft and said flange portion for applying the pretension force to said rotor shaft.

* * * * *